United States Patent Office 3,467,709
Patented Sept. 16, 1969

---

3,467,709
1,1-DIPHENYL-2-METHYL-3-(TRIMETHOXY-BENZ-YLAMINO) - PROPANOLS AND THE SALTS THEREOF
Robert D. Moffett, Kalamazoo, Mich., assignor to The Upjohn Company, Kalamazoo, Mich., a corporation of Delaware
No Drawing. Filed Oct. 21, 1966, Ser. No. 588,303
Int. Cl. C07c *93/14, 119/10;* A61k *27/00*
U.S. Cl. 260—570                                3 Claims

ABSTRACT OF THE DISCLOSURE 1,1 - diphenyl-2-methyl-3(trimethoxybenzylamine)propanols and acid addition salts thereof (with halogen or lower alkyl substitution on the 1,1-diphenyl moiety) having CNS activity, e.g., stimulant, antidepressant, tranquilizing and anticonvulsant. The compounds are prepared by reacting a 1,1-diphenyl-2-methyl-3-aminopropanol with trimethoxybenzaldehyde and reducing the resulting Schiff base.

---

This invention relates to new and useful chemical compounds and more particularly to 1,1-diphenyl-2-methyl-3-(trimethoxybenzylamino)propanols and the acid addition salts thereof.

The 1,1-diphenyl-2-methyl-3-(trimethoxybenzylamino) propanols of the present invention are represented by the formula:

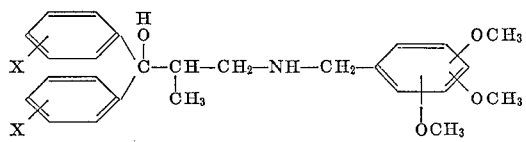

Formula I wherein X is a member selected from the group consisting of hydrogen, halogen, and lower-alkyl having from 1 to 4 carbon atoms, inclusive. Examples of halogen are fluorine, chlorine, bromine, and iodine. Examples of lower-alkyl having from 1 to 4 carbon atoms, inclusive, are methyl, ethyl, propyl, butyl, and isomeric forms thereof.

The compounds of the Formula I can be prepared by reacting a 1,1-diphenyl-2-methyl-3-aminopropanol of the formula:

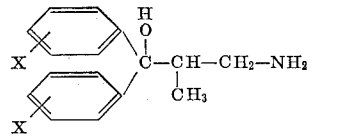

Formula II with a trimethoxybenzaldehyde of the formula:

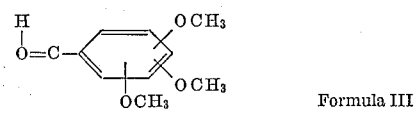

Formula III to prepare a Schiff base of the formula:

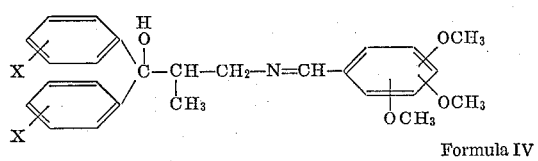

Formula IV and reducing the Schiff base to a compound of the Formula I. In Formulas II and IV, X is as given above.

The primary amines of the Formula II can be prepared by methods disclosed in Spanish Patent No. 316,517 issued Jan. 27, 1966 and Belgian Patent No. 668,835 issued Feb. 28, 1966.

The Formula II primary amine is reacted with the Formula III trimethoxybenzaldehyde in accordance with procedures known in the art for the preparation of Schiff bases. Illustratively, the reaction is carried out in the presence of a water-immiscible, inert solvent such as benzene, toluene, xylene and the like, at the boiling point of the reaction mixture and azeotropically removing the water formed during the reaction. The reactants can be employed in substantially equimolar amounts or an excess of either reactant can be employed if so desired; ordinarily, it is neither necessary nor desirable to employ more than about a 25% excess of a reactant. Upon completion of the reaction, the Schiff base of the Formula IV can be isolated by conventional methods, for example, by evaporating the mixture to dryness.

The Schiff base is then reduced to the secondary amine of the Formula I. Conveniently, the Schiff base is dissolved in anhydrous alkanol such as methanol, ethanol, 1-propanol and the like, and reduced by catalytic hydrogenation, e.g., in the presence of a noble metal catalyst such as as platinum or palladium. Alternatively, the Schiff base can be reduced by sodium borohydride in an inert solvent such as methanol. Upon completion of the reduction the compound of the Formula I can be isolated and purified by conventional methods, for example, when catalytic hydrogenation has been employed, by evaporating the mixture to dryness and recrystallizing the residue from a solvent such as methanol, ethanol and the like; when sodium borohydride reduction has been employed, by evaporating the mixture to dryness, extracting with aqueous acid such as hydrochloric acid, washing the acid extract with ether, basifying the washed extract, extracting the basic mixture with either, evaporating the ether, and recrystallizing the residue.

Acid addition salts of compounds of the Formula I can be prepared by neutralization of the free base with the appropriate amount of an inorganic or organic acid, examples of which are hydrochloric, hydrobromic, sulfuric, nitric, phosphoric, acetic, lactic, benzoic, salicyclic, glycolic, succinic, tartaric, maleic, malic, pamoic, cyclohexanesulfamic, citric and methane-sulfonic acids, and like acids. The neutralization can be carried out by a variety of procedures known to the art to be generally useful for the preparation of amine acid addition salts. The choice of the most suitable procedure will depend on a variety of factors including convenience of operation, economic considerations, and particularly the solubility characteristics of the particular free base, the acid, and the acid addition salt. If the acid is soluble in water, the free base can be dissolved in water containing an equivalent amount of the acid, and thereafter, the water can be removed by evaporation; in some instances, the salt precipitates from the aqueous solution, particularly when cooled, and evaporation is not necessary. If the acid is soluble in a relatively nonpolar solvent, for example, diethyl ether or diisopropyl ether, separate solutions of the acid and free base in such a solvent can be mixed in equivalent amounts, whereupon the acid addition salt will usually precipitate because of its relatively low solubility in the non-polar solvent. Alternatively, the free base can be mixed with an equivalent amount of the acid in the presence of a solvent of moderate polarity, for example, a lower alkanol, a lower alkanone, or a lower-alkyl ester of a lower alkanoic acid. Examples of these solvents are ethanol, acetone, and ethyl acetate, respectively. Subsequent admixture of the resulting solution of acid addition salt with a solvent of relatively low polarity, for example, diethyl ether or hexane, will usually cause precipitation of the acid addition salt. These acid addition salts are useful for upgrading the free bases.

The free bases are useful as acid acceptors in neutralizing undesirable acidity or in absorbing an acid as it is formed in a chemical reaction, for example, a dehydrohalogenation reaction in which hydrogen and chlorine, bromine, or iodine are removed from bicinal carbon atoms.

The compounds of the Formula I form salts with fluosilicic acid which are useful as mothproofing agents according to U.S. Patents 1,915,334 and 2,075,359. They also form salts with thiocyanic acid which condense with formaldehyde to form resinous materials useful as pickling inhibitors according to U.S. Patents 2,425,320 and 2,606,155.

The compounds of this invention also form salts with penicillins. These salts have solubility characteristics which cause them to be useful in the isolation and purification of penicillins, particularly benzyl penicillin. Said salts can be formed either by neutralization of the free base form of a compound of Formula I, with the free acid form of a penicillin, or by a methathetical exchange of the anion of an acid addition salt of a Formula I compound, for example, the chloride ion of a hydrochloride, with the anionic form of a penicillin.

The compounds of the Formula I, including the acid addition salts of pharmacologically acceptable acids, have pharmacological activity in animals, exhibiting a variety of effects associated with the central nervous system, e.g., stimulants, antidepressant, tranquilizing and anticonvulsant.

The compounds of the Formula I are anticonvulsants; they protect animals against thiosemicarbazide-induced convulsions, and antagonize nicotine convulsions and death. Illustratively, in mice 1,1-diphenyl-2-methyl-3-(3,4,5 - trimethoxybenzylamino)propanol hydrochloride has an $LD_{50}$ of 100 mg./kg. a $PD_{50}$ of 50 mg./kg. for thiosemicarbazide convulsions; and a $PD_{50}$ of 25 mg./kg. for nicotine convulsions. The compound is a CNS stimulant in intact mice at 30 mg./kg. and an antiaggressive agent in fighting mice ($PD_{50}$ 27 mg./kg.).

1,1-diphenyl - 2 - methyl - 3-(3,4,5-trimethoxybenzylamino)propanol hydrochloride has an $LD_{50}$ of 141 mg./kg. in rats and causes slight depression at 50 mg./kg. and moderate depression at 100 mg./kg.

The following examples illustrate the best mode contemplated by the inventor for carrying out the invention but are not to be construed as limiting the scope thereof.

EXAMPLE 1

*1,1-diphenyl-2-methyl-3-(3,4,5-trimethoxybenzylamino) propanol*

A solution of 12.05 grams (0.05 mole) of 1,1-diphenyl-2-methyl-3-aminopropanol and 9.81 grams (0.05 mole) of 3,4,5-trimethoxybenzaldehyde in 100 ml. of benzene was refluxed, using a Dean-Stark water trap, until the theoretical amount of water was collected (about 30 minutes). The benzene was removed by evaporation, leaving 1,1-diphenyl-2-methyl-3-(3,4,5 - trimethoxybenzylideamino) propanol as a yellow gum. The yellow gum was dissolved in 150 ml. of absolute ethanol and hydrogenated in the presence of 0.1 gram of platinum oxide catalyst and 2 grams of 10% palladium-on-charcoal catalyst, at 50 lbs. pressure and about 25° C. After 22 hours, the theoretical amount of hydrogen had been absorbed. The solution was then warmed to dissolve a little solid and filtered. The filtrate was concentrated to 130 ml., giving a white solid which was collected, washed with ethanol and dried. The yield was 15.9 grams (75.6% theory) of solid having a melting point of 119–122° C. This was recrystallized from 100 ml. of absolute ethanol, giving 14.9 grams of 1,1-diphenyl-2-methyl - 3-(3,4,5 - trimethoxybenzylamino)propanol as white crystals having a melting point of 120–123° C.

*Analysis.*—Calcd. for $C_{26}H_{31}NO_4$: C, 74.08; H, 7.41; N, 3.32. Found: C, 73.98; H, 7.55; N, 3.40.

EXAMPLE 2

*1,1-diphenyl-2-methyl-3-(3,4,5-trimethoxybenzylamino) propanol hydrochloride*

A solution of 14.3 grams of 1,1-diphenyl-3-(3,4,5-trimethoxybenzylamino)propanol in 150 ml. of ethyl acetate was acidified with ethanolic hydrogen chloride. The acidified solution was diluted with diethyl ether and formed cottony crystals on standing. The crystals were collected, washed with ether and dried, to provide 11.7 grams of 1,1-diphenyl - 2-methyl-3-(3,4,5-trimethoxybenzylamino)propanol hydrochloride (75.4% theory) as a white solid having a melting point of 144–148° C.

*Analysis.*—Calcd. for $C_{26}H_{32}ClNO_4$: C, 68.18; H, 7.04; Cl, 7.74; N, 3.06. Found: C, 67.84; H, 6.89; Cl, 7.99; N, 3.05.

EXAMPLE 3

Following the procedure of the preceding Example 1 but substituting an equimolar amount of each of 2,3,4-trimethoxybenzaldehyde, 2,4,5 - trimethoxybenzaldehyde, and 2,4,6-trimethoxybenzaldehyde for the 3,4,5-trimethoxybenzaldehyde of the example, there can be respectively obtained:

1,1-diphenyl-2-methyl-3-(2,3,4-trimethoxybenzylamino) propanol,
1,1-diphenyl-2-methyl-3-(2,4,5-trimethoxybenzylamino) propanol, and
1,1-diphenyl-2-methyl-3-(2,4,6-trimethoxybenzylamino) propanol.

EXAMPLE 4

Following the procedure of the preceding Example 1 but substituting for the 1,1-diphenyl-2-methyl-3-aminopropanol of the example an equimolar amount of each of 1,1-bis(2-bromophenyl)-2-methyl-3-aminopropanol,
1,1-bis(3-bromophenyl)-2-methyl-3-aminopropanol,
1-phenyl-1-(2-chlorophenyl)-2-methyl-3-aminopropanol,
1,1-bis(4-chlorophenyl)-2-methyl-3-aminopropanol,
1,1-bis(2-iodophenyl)-2-methyl-3-aminopropanol,
1-phenyl-1-(4-fluorophenyl)-2-methyl-3-aminopropanol,
1-phenyl-1-(3-iodophenyl)-2-methyl-3-aminopropanol,
1-phenyl-1-(2-methylphenyl)-2-methyl-3-aminopropanol,
1-(2-bromophenyl)-1-(4-methylphenyl)-2-methyl-3-aminopropanol,
1phenyl-1-(4-propylphenyl)-2-methyl-3-aminopropanol,
1-phenyl-1-(3-fluorophenyl)-2-methyl-3-aminopropanol,
1,1-bis(4-fluorophenyl)-2-methyl-3-aminopropanol, and
1,1-bis(3-fluorophenyl)-2-methyl-3-aminopropanol, there can be respectively obtained 1,1-bis(2-bromophenyl)-2-methyl-3-(3,4,5-trimethoxybenzylamino)propanol,
1,1-bis(3-bromophenyl)-2-methyl-3-(3,4,5-trimethoxybenzylamino)propanol,
1-phenyl-1-(2-chlorophenyl)-2-methyl-3-(3,4,5-trimethoxybenzylamino)propanol,
1,1-bis(4-chlorophenyl)-2-methyl-3-(3,4,5-trimethoxybenzylamino)propanol,
1,1-bis(2-iodophenyl)-2-methyl-3-(3,4,5-trimethoxybenzylamino)propanol,
1-phenyl-1-(4-fluorophenyl)-2-methyl-3-(3,4,5-trimethoxybenzylamino)propanol,
1-phenyl-1-(3-iodophenyl)-2-methyl-3-(3,4,5-trimethoxybenzylamino)propanol,
1-phenyl-1-(2-methylphenyl)-2-methyl-3-(3,4,5-trimethoxybenzylamino)propanol,
1-(2-bromophenyl)-1-(4-methylphenyl)-2-methyl-3-(3,4,5-trimethoxybenzylamino)propanol,
1-phenyl-1-(4-propylphenyl)-2-methyl-3-(3,4,5-trimethoxybenzylamino)propanol,
1-phenyl-1-(3-fluorophenyl)-2-methyl-3-(3,4,5-trimethoxybenzylamino)propanol,
1,1-bis(4-fluorophenyl)-2-methyl-3-(3,4,5-trimethoxybenzylamino)propanol, and 1,1-bis(3-fluorophenyl)-2-methyl-3-(3,4,5-trimethoxy-benzylamino)propanol.

What is claimed is:

1. A compound of the formula:

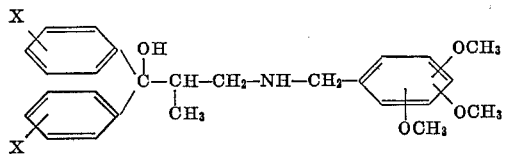

wherein X is a member selected from the group consisting of hydrogen, halogen and lower-alkyl containing from 1 to 4 carbon atoms, inclusive, including the acid addition salts thereof.

2. A compound of claim 1 wherein X is hydrogen and the compound is 1,1-diphenyl-2-methyl-3-(3,4,5-trimethoxybenzylamino)propanol.

3. The compound of claim 2 in the form of the hydrochloride.

References Cited

Barron et al.: "Jour. Med. Chem.," vol. 8, pp. 836–41 (1965).

Kasuya: "Chemical Abstracts," vol. 53, pp. 4552–53 (1959).

ROBERT V. HINES, Primary Examiner

U.S. Cl. X.R.

260—239.1, 501.12, 501.18, 501.19, 566, 999